United States Patent [19] [11] Patent Number: 4,706,946
Thorn et al. [45] Date of Patent: Nov. 17, 1987

[54] MOTION CONTROL STRUT

[76] Inventors: Richard P. Thorn; Leonard J. Schwemmer, both of Lord Corporation, 1635 W. 12th St., Erie, Pa. 16512

[21] Appl. No.: 801,232

[22] Filed: Nov. 25, 1985

[51] Int. Cl.⁴ .................. F16F 7/00; F16F 1/36; B60G 11/22; F16M 13/00
[52] U.S. Cl. .................. 267/292; 248/636; 267/141.1; 267/153
[58] Field of Search .................. 267/8 R, 9 B, 63 R, 267/63 A, 136, 140.1, 140.3, 140.5, 141, 141.1, 141.3, 152, 153, 134; 180/295, 300; 248/562, 605, 636, 606

[56] References Cited

U.S. PATENT DOCUMENTS

| 546,831 | 9/1895 | Spencer | 267/63 R |
| 3,677,535 | 7/1972 | Beck | 267/63 R |
| 3,825,090 | 7/1974 | Runkle et al. | 180/300 X |
| 4,053,148 | 10/1977 | Chalmers | 267/63 R |
| 4,240,517 | 12/1980 | Harlow, Jr. et al. | 180/295 |
| 4,392,640 | 7/1983 | Kakimoto | 267/141.2 |
| 4,518,058 | 5/1985 | Fister et al. | 180/300 |

FOREIGN PATENT DOCUMENTS

| 0733478 | 10/1932 | France | 267/63 R |
| 1316567 | 12/1962 | France | 267/63 R |

Primary Examiner—Andres Kashnikow
Assistant Examiner—Robert J. Oberleitner

[57] ABSTRACT

A strut connecting a transversely mounted engine to an automobile frame component accommodates normal engine oscillation within a limited range of motion, such occurs at idle, while restraining excessive engine motion such as occurs during acceleration. The strut includes a complementary pair of elongate plates slidably mounting therebetween at opposite ends a pair of friction elements each of which is compressed between the plates by attachment means for connecting the strut in place. The attachment means includes a pair of elastomeric blocks bonded to the plates and washers bonded to the blocks and interconnected by a sleeve passing transversely through apertures in the plates and the friciton element. The aperture in the friction element is smaller than the apertures in the plates to provide a gap around the attachment sleeve. The elastomeric blocks provide an elastic shear connection which permits the attachment sleeve to oscillate axially through a limited extent relative to the plates for accommodating normal engine oscillations while enabling the sleeve to engage the friction element and displace it between the plates for controlling and damping engine motion outside the permitted range.

7 Claims, 6 Drawing Figures

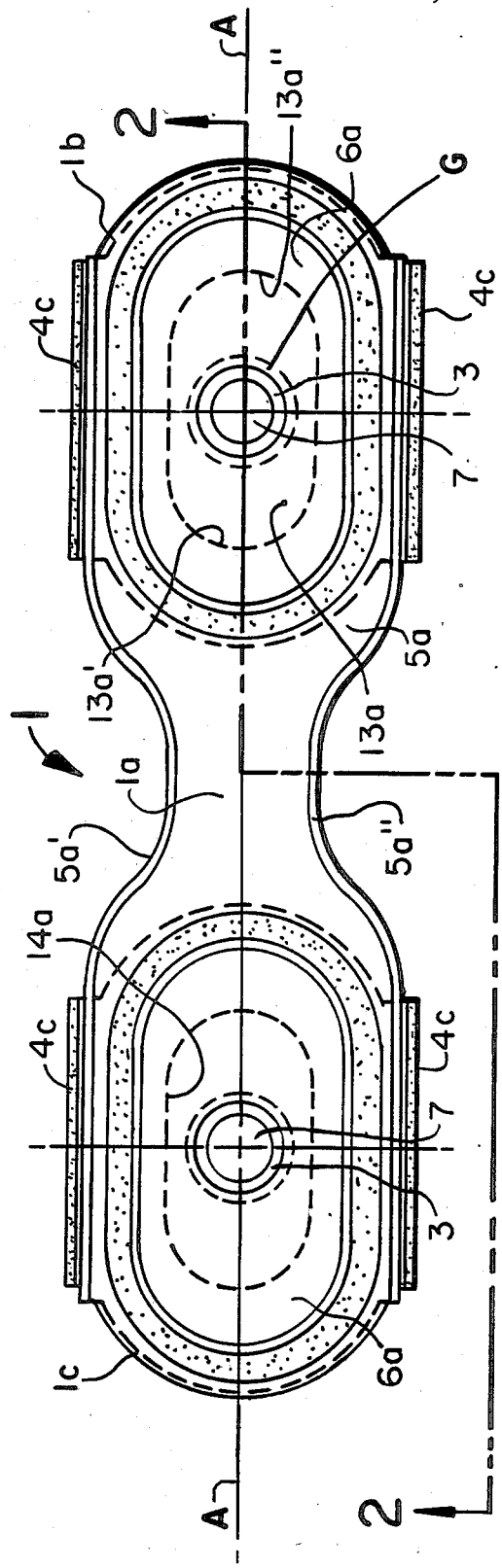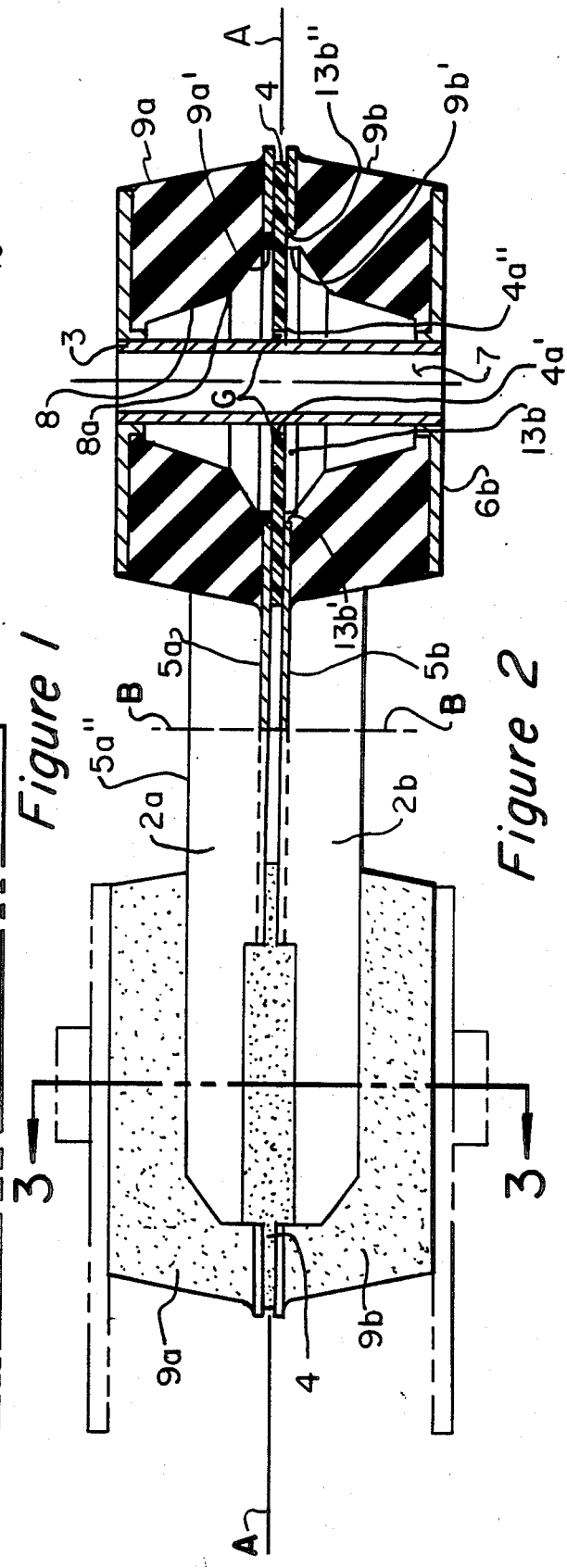

MOTION CONTROL STRUT

FIELD OF THE INVENTION

The present invention relates to mechanical connecting links or struts, and more particularly, the present invention relates to struts which can accommodate oscillatory axial endwise motion within a limited range and can damp motion outside the range.

BACKGROUND OF THE INVENTION

In many front wheel drive automobiles currently on the market, the engine is mounted transversely in the engine compartment and is customarily supported on elastic mounts and elastically connected to a frame component of the automobile by means of a so-called torque strut. The torque strut functions to control angular displacement of the engine, such as when output torque increases during acceleration and during braking, while accommodating normal engine oscillations, such as when the engine is operating at idle.

Known torque struts include an elongate member mounting at opposite ends a pair of sleeved rubber bushings for receiving a connecting bolt. While such struts have been capable of performing the aforedescribed functions, they have certain limitations. For instance, the rubber bushings at the ends of the struts are prone to deterioration due to large motions across the bushings while subjected to the heat of the engine so that, after a period of time, the bushings crack and stiffen. As a result, the struts develop a proclivity for transmitting engine vibrations and noises to the frame and hence into the passenger compartment, particularly during acceleration of the automobile when the strut is subjected to substantial tensile loads.

Special struts have been proposed to overcome some of the aforementioned problems. An example of such a strut may be found in U.S. Pat. No. 4,392,640. The patented strut utilizes rubber bushings having specially shaped interior cavities for providing the desired motion accommodation. U.S. Pat. No. 4,518,058 discloses a damped anti-torque strut which utilizes an hydraulic fluid displaceable axially in a chamber by means of a piston spring loaded into a central position.

While the aforementioned struts may function satisfactorily for their intended purposes, there is a need for a durable torque strut which avoids transmitting engine vibrations over a broad range of engine operating conditions while being readily manufacturable.

OBJECTS OF THE INVENTION

With the foregoing in mind, a primary object of the present invention is to provide a novel strut which can be installed in an automobile to accommodate a normal range of engine oscillations while restraining the engine against excessive motion during changes in torque output.

Another object of the present invention is to provide an improved strut capable of accommodating a limited amount of oscillatory axial end motion and of damping such motion when it exceeds a predetermined extent.

A further object of the present invention is to provide a rugged torque strut which can be manufactured readily.

SUMMARY OF THE INVENTION

More specifically, the present invention provides a strut which resiliently accommodates endwise axial oscillatory motion within a predetermined range and which damps such axial motion beyond that range. The strut comprises a complementary pair of elongate plates extending in spaced parallel relation and friction means slidably mounted between the plates adjacent their ends. The plates have aligned apertures adjacent their ends, and the friction means has an aperture smaller in size than the plate apertures and aligned therewith. A pair of elastomeric blocks are bonded to the plates around the apertures therein and protrude laterally from the plates at each end thereof. The elastomeric blocks are connected to a pair of washers bonded to the blocks and interconnected by an attachment sleeve passing through the apertures in the plates and friction means. The interconnected washers compress the elastomeric blocks and thereby apply a controlled normal force producing friction between the plates and friction means. A gap is provided between the attachment sleeve and the edges of the aperture in the friction means to enable the attachment sleeve to oscillate back and forth within a limited range as permitted by the elasticity of the elastomeric blocks. When the sleeve moves beyond the limited range, it engages an edge of the aperture in the friction means and slides it between the plates to provide a friction damping action. Further axial displacement of the attachment sleeve is limited by primary and secondary snubbing surfaces provided on the insides of elastomeric blocks to arrest and thereby limit the ultimate extent of movement of the attachment sleeve relative to the plates. In alternate embodiments, the friction means provides a multi-stage friction damping action in response to an increasing axial extent of displacement of the attachment sleeve relative to the plates.

BRIEF DESCRIPTION OF THE DRAWINGS

The foregoing and other objects, features and advantages of the present invention should become apparent from the following description when taken in conjunction with the accompanying drawings, in which:

FIG. 1 is a plan view of a motion control strut embodying the present invention;

FIG. 2 is a longitudinal sectional view taken on irregular line 2—2 of FIG. 1;

DESCRIPTION OF THE PREFERRED EMBODIMENTS

Figure 3:
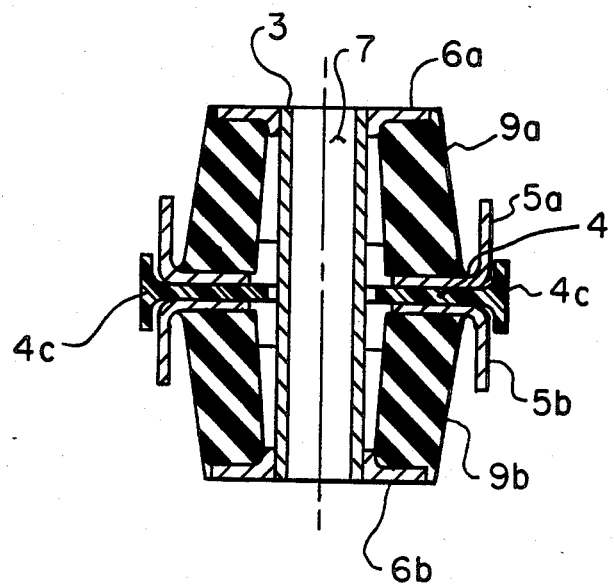
FIG. 3 is a transverse sectional view taken on line 3—3 of FIG. 2.

The conventional reciprocating piston internal combustion engine tends to oscillate in various directions in operation. Despite efforts to balance the engine and to accommodate engine motion by appropriate engine mount design, it has not been possible entirely to eliminate such motion. For instance, in some front wheel drive automobiles having transversely set engines, the engine tends to oscillate angularly about an axis generally parallel to the crankshaft. The amplitude of such angular oscillation normally falls within a predetermined normal range during steady state engine operation. However, when subjected either to a torque or to an inertia force of sufficiently large magnitude, the engine reacts and tilts about the axis beyond its normal range of oscillation. To limit angular displacement of the engine under this condition, some automobile manufacturers connect the upper portion of the engine to a transverse frame member in the engine compartment of the automobile by means of a strut, such as in the manner illustrated in U.S. Pat. No. 4,518,058, the disclosure of which is incorporated by reference herein.

While some attempts have been made to provide a strut capable of accommodating the aforementioned engine motions, heretofore there has not been commercially available a strut which accommodates the desired degree of engine motion with a relatively simple structure which is durable and capable of being manufactured readily by conventional manufacturing technology.

The present invention overcomes the limitations of prior art struts by providing a strut which is capable of resiliently accommodating endwise axial displacement within a predetermined range and of damping endwise axial displacement occurring beyond that range. The strut also resiliently accommodates a limited amount of motion in other directions. Thus, when connected to an automobile engine and frame in the conventional manner, the strut accommodates normal engine oscillations while controlling excessive torque or inertia induced engine motions.

Referring now to the drawings, FIG. 1 illustrates a strut 1 which embodies the present invention. The strut 1 is horizontally elongated and is symmetrical both with respect to an elongate axis A passing centrally through the strut 1 and with respect to a transverse axis B (FIG. 2). The strut 1 preferably has a necked down central portion 1a located between its right-hand end portion 1b and its left-hand end portion 1c. The right-hand end portion 1b is typically of identical construction to the left-hand end portion 1c, so that reference will be made hereinafter to the right-hand end shown in section in FIG. 2.

As best seen in FIG. 2, the strut 1 is of laminated construction and comprises complementary upper and lower assemblies 2a and 2b, respectively. The upper assembly 2a comprises a metal plate 5a having a substantially flat portion extending along the axis A and a pair of upturned longitudinal stiffening flanges 5a', 5a''. The plate 5a has an elongate aperture 13a in its right-hand end portion and an elongate aperture 14a in its left-hand end portion. The axial extent of the aperture 13a is defined by means of a pair of arcuate axially spaced inner and outer transverse edges 13a', 13a'', respectively. The lower plate 5b has a similarly shaped aperture 13b with axial inner and outer end edges 13b', 13b'', respectively aligned with the edges of the upper plate aperture 13a. The left-hand ends of the upper and lower plates 5a and 5b are similarly provided with edge means defining aligned apertures, such as the aperture 14a in the upper plate 5a. The parallel plates 5a, 5b constitute the primary tensile and compressive load carrying components of the strut 1.

For the purpose of mounting the strut 1 in its intended environment, each end of the strut 1, such as the right-hand end 1b, is provided with motion controlling attachment means. As best seen in FIG. 2, the attachment means includes a sleeve 3 having a through bore 7 adapted to receive a fastener, such as a bolt. The sleeve 3 is disposed transversely with respect to the plates 5a, 5b, passing through the apertures 13a, 13b, therein at about the axial midpoint thereof as shown in FIG. 1 when the strut is in a home, or at rest, position. If desired, the sleeves may be biased axially toward the center of the strut, so that at idle torque, they are centered in the plate apertures; or, the sleeves may be offset to accommodate more motion in the "Drive" direction of engine rotation than in the "Reverse" direction.

Elongated washers 6a and 6b are fixedly secured to the upper and lower ends of the sleeve 3, as by staking, and extend axially therefrom in opposite directions in parallel relation with respect to the upper and lower plates 5a, 5b, respectively. An upper block of elastomeric material 9a is bonded between the upper washer 6a and the upper plate 5a, and a lower block of elastomeric material 9b is likewise bonded between the loner washer 6b and the lower plate 5b. Each elastomeric block thus provides an elastic shear connection between the plate and washer bonded thereto. The elastic shear connection enables the sleeve 3 to oscillate freely back and forth on the axis A within a predetermined axial range. Desirably, the elastomeric blocks are axially elongated to provide a maximum volume of elastomeric material in the axial direction to provide appropriate stiffness and to accommodate substantial axial displacements in such direction while providing limited degrees of displacement in other directions.

The ultimate range of movement of the attachment sleeve 3 is determined by the axial spacing between the end edges of the plate apertures. However, to prevent the sleeve 3 from bottoming against either the inside edge 13a' or the outside edge 13a'' of the apertures such as the upper plate aperture 13a and making a noise when the limit is reached, elastomeric snubbing abutment means 9a', 9b' are provided around the aperture edges and are thereby interposed between the plate aperture edges and the attachment sleeve 3. Preferably, the snubbing abutment means 9a', 9b' are provided by integral depending lips molded on the elastomeric blocks 9a, 9b.

Figure 4:
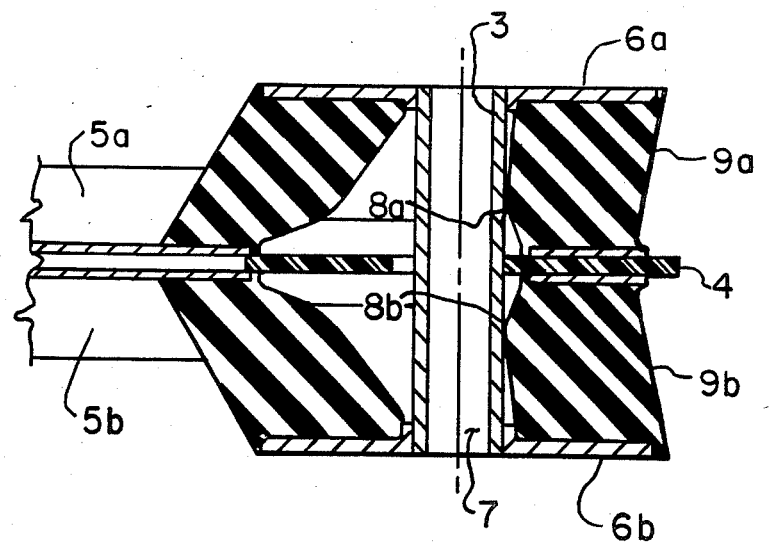
FIG. 4 is a longitudinal sectional view of an end portion of the strut, similar to the section illustrated in FIG. 2, but showing the strut components in an axially tensioned condition.

For the purpose of absorbing some of the energy of the attachment sleeve 3 before it reached its ultimate limit of motion and engages the abutment lips 9a', 9b', primary snubbing means is provided on the insides of each elastomeric block 9a, 9b. To this end, as best seen in FIG. 2, each elastomeric block, such as the upper block 9a, has an inner surface 8 which tapers inwardly and upwardly from a location adjacent the aperture 13a in the upper plate 5a to a location adjacent where the sleeve 3 connects to the upper washer 6a. The tapered surface 8 has a protrusion 8a which is normally disposed in spaced confronting relation with respect to the sleeve 3 but which is adapted to be engaged by the sleeve 3, such as in the manner illustrated in FIG. 4, when the sleeve 3 moves rightward relative thereto during tensioning of the strut 1. When thus engaged, the protrusion 8a on the block of elastomeric material 9a provides a gradually increasing load area and stiffening to provide a soft snubbing action tending to arrest motion of the sleeve 3 before it engages the elastomeric abutment lip 9a' around the plate aperture 13a. A similar action is provided when the strut is compressed and the sleeve 3 is displaced leftward relative to the plates 5a, 5b during compression of the strut 1.

According to the present invention, the sleeve 3 is permitted to undergo a limited amount of axial oscillation in a substantially undamped manner; however, when the amplitude of the oscillation of the sleeve 3 exceeds the limited axial extent, a means is provided for directly engaging the sleeve 3 and thereby damping the motion of the attachment means relative to the strut plates 5a, 5b before motion of the sleeve 3 is completely arrested. In the present invention, the damping action is provided by friction means 4 slidably engaged between the plates 5a and 5b adjacent the ends thereof.

In the first illustrated embodiment shown in FIG. 2, the friction means 4 includes a substantially flat friction element interposed for sliding movement between the upper plate 5a and the lower plate 5b. The friction element 4 is made of polymeric or other material having a relatively high and consistent coefficient of friction relative to the confronting surfaces of the plates 5a, 5b. A desirable friction material is Rulon, a filled tetrafluoroethylene composition sold by Dixon Chemical Co., having a low static to dynamic coefficient of friction ratio. Desirably, such material may be provided as layers on opposite sides of a metal plate, or as solid molded elements.

The friction element 4 has an aperture 4a with an inner axial edge 4a' and an outer axial edge 4a''. In the illustrated embodiment, both the attachment sleeve 3 and aperture 4a in the friction element 4 are circular, and the gap G between the sleeve 3 and friction element 4 is annular. Thus, the size of the gap G along the axis A determines the axial extent of elastic relative movement between the sleeve 3 and the plates 5a, 5b. The axial spacing between the edges 4a', 4a'' of the friction element 4 is less than the corresponding spacing between the edges 13a', 13a'' of the plate aperture 13b.

Preferably, the axial extent or length of the gap G is based on the anticipated amplitude of engine oscillation at idle speed, i.e. the inside diameter of the friction element aperture 4a is greater than the outside diameter of the sleeve 3 by an amount corresponding to the amplitude of anticipated upper end engine motion at idle speed. Also, the gap G is dimensioned widthwise or transverse to the axis A to permit a limited amount of pivotal and transverse movement of the attachment sleeve 3 relative to the plates 5a, 5b such as normally occurs as the engine tilts. In the illustrated embodiment, the aperture in the friction element 4 is circular; however, there may be particular applications where elliptical or axially elongated shapes may be desirable such as to accommodate more sleeve motion in one axial direction than the other before the friction element is engaged and displaced.

The strut 1 has built-in wear compensation. To this end, the plates 5a, 5b are urged together laterally only by the compressive action of the elastomeric blocks at the ends of the strut. The magnitude of the friction force applied between the friction element 4 and the plates 5a, 5b is determined by the amount of compression of the elastomeric blocks 9a, 9b between the washers 6a, 6b and the plates 5a, 5b. This, in turn, is determined by the modulus of the elastomer composing the blocks, the size and shape of the elastomeric blocks 9a, 9b, and of the location of connection of the washers 6a, 6b on the sleeve 3. The compression of the elastomeric blocks maintains frictional engagement between the friction element 4 and the plates 5a, 5b even in the event that the thickness of the friction element is considerably reduced by wear after prolonged use of the strut 1.

To prevent the friction element 4 from rotating between the plates 5a, 5b in the normal course of operation, the friction element 4 is axially elongated and is provided with a pair of elongate flanges 4c, 4c (FIG. 3) which extend alongside the longitudinal flanges 5a', 5b' provided on the upper and lower plates 5a, 5b, respectively. Other forms of guiding means may be utilized, such as a mating groove and rib extending axially in the plates and friction element.

The friction element 4 provides a friction damping action as it slides between the plates 5a, 5b when the attachment sleeve 3 moves axially. For instance, as the attachment sleeve 3 moves rightward from the normal position illustrated in FIG. 2, it first engages the outer edge 4a'' of the friction element 4 and then slides the friction element 4 rightward between the plates 5a, 5b. As the friction element 4 slides rightward, a retarding friction force is applied axially leftward to the sleeve 3 to provide a motion damping action. Further rightward motion of the sleeve 3 is retarded when the sleeve 3 engages the protruding snubbing surface 8a on the elastomeric blocks 9a, 9b, and motion is completely arrested when the sleeve 3 engages the elastomeric lips 9a', 9b' around the apertures in the plates 5a, 5b.

When the axial tensile force on the attachment sleeve 3 is removed, there is a tendency for the elastomeric blocks 9a, 9b to displace the attachment sleeve 3 axially leftward until it engages the inner edge 4a' of the aperture 4a in the friction element 4 whereupon the friction element 4 is displaced leftward. The friction element 4 is also displaced leftward when the strut is subjected to axial compressive forces, such as occurs when the engine tilts forward due to the inertia during braking of the automobile. Thus, friction damping is also provided in the axially inward direction. As a result, the strut 1 can damp undesirable engine motion in opposite directions caused by sudden changes in engine output torque or inertia forces.

Figure 5:
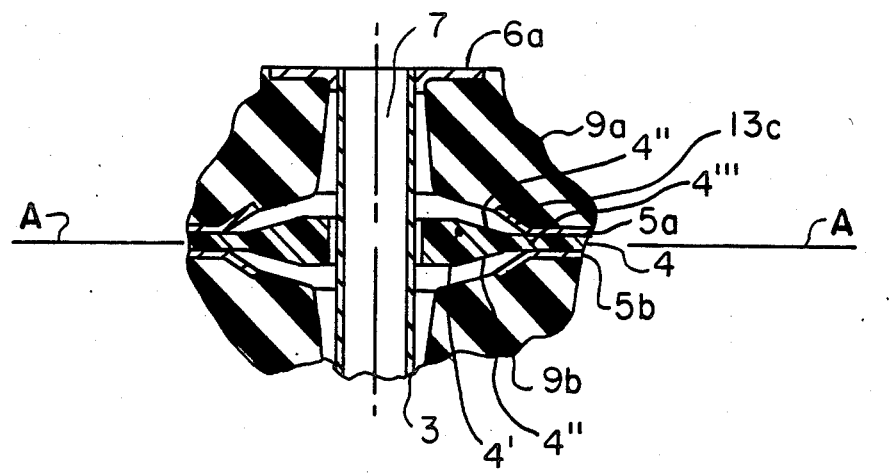
FIG. 5 is a fragmentary sectional view of a modified embodiment of the present invention which provides a multi-stage friction damping action.

In the embodiment of FIGS. 1-4, a single stage friction damping action is provided, i.e., a substantially constant sliding friction force of a predetermined magnitude is applied throughout the full range of displacement of the friction element 4. If desired, a modified embodiment of the present invention may be provided wherein the sliding friction force increases with increased displacement of the sleeve relative to the plates to provide a multi-stage friction damping action. To this end, a modified strut (FIG. 5) is provided which is like the strut of FIGS. 1-4 but wherein the friction element 4 has an enlarged portion 4' surrounding the sleeve 3 and a transition portion with tapered surfaces 4'' connecting the enlarged portion 4' and the portion 4'''' disposed between the plates 5a, 5b. The tapered transition portion 4'' is adapted to engage between outturned marginal edge portions of the apertures in the plates 5a, 5b, such as the upturned margin 13c of the upper plate 5a. Thus, in this embodiment, as the attachment sleeve 3 displaces the friction element 4 through a predetermined distance, a retarding friction force of a first predetermined magnitude is applied to the attachment sleeve 3 by the interaction of the first portion 4''' with the plates 5a, 5b until such time as the transition surfaces 4'' of the friction element 4 engage the plate edge margins, such as when the surface 4'' engages plate surface 13c, whereupon the magnitude of the friction applied to the sleeve 3 increases and becomes greater than the magnitude of the friction force initially applied. As a result, the applied friction force increases with increases in axial displacement of the attaching sleeve 3, so that a multi-stage friction damping action is provided.

Figure 6:
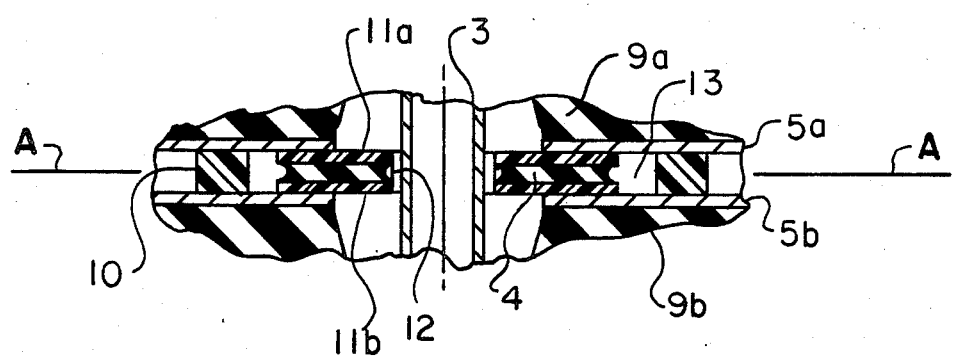
FIG. 6 is a fragmentary sectional view of a another modified embodiment of the present invention which also provides multi-stage friction damping action.

If desired, a multi-stage friction damping action may be provided in another manner. As best seen in FIG. 6, the first stage friction force is provided by a modified friction element 4 which comprises a pair of friction discs 11a, 11b between which is laminated a layer of elastomeric material 12 to provide a first friction element. A friction ring 10 surrounds the first mentioned friction element 4 and is engaged between the plates 5a and 5b to provide a second friction element. An annular space 13 is provided between the first and second friction elements. As in the previous embodiments, compression of the outer friction member 10 between the plates 5a and 5b determines the magnitude of the friction force applied therebetween. While the inner or first friction element 4 is similarly compressed, the magnitude of the friction force it can apply is controlled by the coefficient of friction, the thickness, the area, and the modulus of the elastomeric layer 12. If desired, a metal spring element, such as small leafsprings or Bellville washers may be used instead of elastomeric layer 12. With this construction, the magnitude of the second friction force can be readily made greater than the magnitude of the first friction force.

In this embodiment, movement of the attachment sleeve 3 axially displaces the inner friction element 4 between the plates 5a, 5b and thereby applies a friction retarding action of a first magnitude to the attachment sleeve 3 until such time as the inner friction element 4 axially engages the outer friction element 10. When this occurs, further displacement of the attachment sleeve 3 causes the outer friction element 10 to move axially. However, since the friction force between the outer friction element 10 and the plates 5a, 5b is greater than the friction force between the inner friction element 4 and the plates 5a, 5b, the magnitude of the friction retarding force applied to the attachment sleeve 3 increases with increased axial displacement of the attachment sleeve 3.

In the illustrated embodiments, each end of the strut is of identical construction. If desired, however the end constructions need not be identical but can be varied to suit particular applications. For example, the stiffness of the elastomeric blocks can be different resulting in an amplitude of motion at each end in proportion to the stiffness. The difference in stiffness can be made by varying the area, the modulus or thickness of the elastomeric blocks. Similarly, the friction force can be made different at each end, as by using friction elements of different coefficients of friction, and varying the pre-compression of the elastomeric blocks by using sleeves of various lengths or friction elements of different thicknesses.

In view of the foregoing, it should be apparent that the present invention now provides an improved strut which is capable of resiliently accommodating a limited amount of endwise motion and of damping endwise motion beyond a limited extent. Thus, when used to connect an engine to a frame component in an automobile, the strut softly accommodates engine oscillations at idle speed while stiffly resisting engine oscillations of a greater magnitude. The symmetry of the strut, and the commonality of its components, enables it to be manufactured economically by high speed mass production techniques.

Accordingly, while preferred embodiments of the present invention have been described in detail, various modifications, alterations and changes may be made without departing from the spirit and scope of the present invention as defined by the appended claims.

We claim:

1. A self-damping strut for connecting structures movable relative to one another on an axis, comprising:
   first means for attaching one end of the strut to one of the structures;
   second means for attaching the other end of the strut to the other one of the structures;
   friction damping means in said strut cooperable with at least one of said attaching means to damp relative motion between said attaching means in response to a predetermined extent of relative axial movement of said structures;
   said friction damping means including:
      a pair of plates extending in parallel relation along said axis,
      at least one friction element engaged between said plates and slidable relative thereto,
      each of said pair of plates and said friction element having a pair of edges disposed in spaced relation transverse to said axis and defining an aperture in each of said pair of plates and said friction element, the edges in said friction element being located closer together than the edges in said plates,
      a pair of blocks of elastomeric material protruding from said plates and surrounding the aperture in each plate,
      washer means engaging said blocks of elastomeric material outboard of said plates for cooperating therewith to provide an elastic shear connection permitting motion through a predetermined axial extent,
      said one attaching means including a sleeve extending transversely through said plate and friction element apertures and interconnecting said washer means to compress said elastomeric blocks and thereby apply pressure to said friction element,
   the spacing between the sleeve and the friction element edges normally permitting motion to occur until said predetermined extent has been reached, whereupon said sleeve engages said friction element edges and displaces the friction element relative to the plates for effecting a motion damping action.

2. A self-damping strut according to claim 1 including auxiliary friction means engaged between said plates and cooperable with said one friction element after displacement thereof through a predetermined axial extent to provide a friction force on said sleeve having a magnitude greater than the friction force provided by said one friction element.

3. A self-damping strut according to claim 1 including first and second snubbing means provided integral with said elastomeric blocks in spaced confronting relation with said attachment sleeve, said first snubbing means being located between said plates and said washers and said second snubbing means being located between said plate edges and said attachment sleeve, said first snubbing means being located closer to said attachment means sleeve than said second snubbing means.

4. A friction damped motion control strut, comprising:
   a pair of elongate plates extending in parallel relation on an elongate axis and adapted to be operatively coupled at opposite ends to spaced structures;

friction means engaged between said plates and movable relative thereto adjacent at least one of said ends;

edge means spaced apart on said plates along said axis and friction means and defining aligned apertures therein;

attachment means having a portion extending transversely through said aligned apertures and adapted to fasten said strut to said spaced structures;

said attachment means including elastomeric means providing an elastic shear connection between said plates and said attachment means portion for enabling said attachment means portion to undergo substantially free resilient displacement through a limited axial extent relative to said plates along said axis;

said edge means in said plates and said friction means cooperating with said attachment means portion to define therebetween gaps permitting said resilient displacement on said axis until said limited extent of motion has been reached, whereupon the attachment means portion engages the edge means in said friction means and displaces the friction means relative to the plates for causing a motion damping action to occur within the strut, wherein said edge means incudes a pair of edges disposed transverse to said axis on opposite sides of said attachment means portion with the pair of edges on said friction means being located closer together on said axis than the pair of edges on said plates so that when said attachment means reaches said limit of motion it engages said friction means and displaces it toward said plate edges; and wherein said elastomeric means includes a pair of elastomeric blocks extending transversely outward of said plates in opposite directions, and said attachment means includes a pair of washers engaging said blocks outboard of said plates and a connecting member extending through said aligned apertures for compressing said elastomeric blocks between said washers and said plates and thereby affecting the magnitude of the friction force generated between the friction means and the plates; and including snubbing surfaces means on said elastomeric blocks normally confronting said connecting member in spaced relation and engageable with said connecting member after it has displaced the friction means through predetermined extent to effect a snubbing action between said attachment means and said plates wherein said snubbing surface means converges toward each washer from said plate edges and has an intermediate protrusion adapted to engage said connecting member in response to said predetermined extent of displacement of said friction means relative to said plates.

5. A friction damped motion control strut according to claim 4 including elastomeric abutment means interposed between said plate edges and said connecting member and cooperable therewith to provide an auxiliary snubbing action when the connecting member reaches the ultimate limit of its motion relative to the plates.

6. A friction damper motion control strut, comprising:

a pair of elongate plates extending in parallel relation on an elongate axis and adapted to be operatively coupled at opposite ends to spaced structures;

friction means engaged between said plates and movable relative thereto adjacent at least one of said ends;

edge means spaced apart on said plates along said axis and friction means and defining aligned apertures therein;

attachment means having a portion extending transversely through said aligned apertures and adapted to fasten said strut to said spaced structures;

said attachment means including elastomeric means providing an elastic shear connection between said plates and said attachment means portion for enabling said attachment means portion to undergo substantially free resilient displacement through a limited axial extent relative to said plates along said axis;

said edge means in said plates and said friction means cooperating with said attachment means portion to define therebetween gaps permitting said resilient displacement on said axis until said limited extent of motion has been reached, whereupon the attachment means portion engages the edge means in said friction means and displaces the friction means relative to the plates for causing a motion damping action to occur within the strut;

wherein said friction means includes a first friction element displaceable through a first axial extent to provide a first friction force and a second friction element displaceable through a second axial extent beyond said first axial extent to provide a second friction force greater than the first; and an element having a planar portion engaged between said plates to provide said first friction element and an enlarged portion adjacent thereto cooperable with said plates to provide said second friction element.

7. A friction damped motion control strut, comprisng:

a pair of elongate plates extending in parallel relation on an elongate axis and adapted to be operatively coupled at opposite ends to spaced structures;

friction means engaged between said plates and movable relative thereto adjacent at least one of said ends;

edge means spaced apart on said plates along said axis and friction means and defining aligned apertures therein;

attachment means having a portion extending transversely through said aligned apertures and adapted to fasten said strut to said spaced structures;

said attachment means including elastomeric means providing an elastic shear connection between said plates and said attachment means portion for enabling said attachment means portion to undergo substantially free resilient displacement through a limited axial extent relative to said plates along said axis;

said edge means in said plates and said friction means cooperating with said attachment means portion to define therebetween gaps permitting said resilient displacement on said axis until said limited extent of motion has been reached, whereupon the attachment means portion engages the edge means in said friction means and displaces the friction means relative to the plates for causing a motion damping action to occur within the strut;

wherein said friction means includes first and second friction elements engaged between said plates and normally axially separated from one another, said first friction element including a pair of friction discs engaging said plates and elastic means interposed between said discs, said second friction element surrounding said first friction element, the friction between said second friction element and said plates being greater than the friction between said first friction element and said plates, whereby said first friction element provides said first friction force until it engages and displaces said second friction element to provide said second friction force, whereby a two stage friction damping action is provided.

* * * * *